United States Patent
Ishii

(10) Patent No.: US 9,531,939 B2
(45) Date of Patent: Dec. 27, 2016

(54) DETECTION APPARATUS, IMAGE PICKUP APPARATUS, IMAGE PICKUP SYSTEM, AND CONTROL METHOD OF THE DETECTION APPARATUS

(71) Applicant: CANON KABUSHIKI KAISHA, Tokyo (JP)

(72) Inventor: Hirokazu Ishii, Chofu (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/513,766

(22) Filed: Oct. 14, 2014

(65) Prior Publication Data

US 2015/0109518 A1 Apr. 23, 2015

(30) Foreign Application Priority Data

Oct. 18, 2013 (JP) .................................. 2013-217328

(51) Int. Cl.
*H04N 5/232* (2006.01)
*G03B 13/36* (2006.01)

(52) U.S. Cl.
CPC ........... *H04N 5/23212* (2013.01); *G03B 13/36* (2013.01)

(58) Field of Classification Search
CPC ................................................. H04N 5/23212
USPC ........................................................ 348/350
See application file for complete search history.

(56) References Cited

U.S. PATENT DOCUMENTS

| 2011/0164166 A1 | 7/2011 | Oikawa |
| 2011/0228145 A1 | 9/2011 | Kimura |
| 2012/0162492 A1* | 6/2012 | Akamatsu .......... H04N 5/23212 348/345 |
| 2013/0250164 A1* | 9/2013 | Aoki ........................ G02B 7/34 348/348 |
| 2013/0335606 A1* | 12/2013 | Aoki ........................ G02B 7/34 348/296 |

(Continued)

FOREIGN PATENT DOCUMENTS

| CN | 101841656 A | 9/2010 |
| CN | 102422196 A | 4/2012 |

(Continued)

OTHER PUBLICATIONS

Chinese Office Action issued in corresponding application No. 201410551264.6 on Mar. 2, 2016.

(Continued)

*Primary Examiner* — Gevell Selby

(74) *Attorney, Agent, or Firm* — Carter, DeLuca, Farrell & Schmidt, LLP

(57) ABSTRACT

A detection apparatus configured to detect a focus state based on an output signal from an image pickup element capable of outputting an image pickup signal and a phase-difference detection signal includes, a first calculation unit configured to calculate information related to a first phase difference based on the phase-difference detection signal output from the image pickup element, a second calculation unit configured to calculate information related to a second phase difference based on the image pickup signal output from the image pickup element, and a detection unit configured to detect the focus state based on the information related to the first phase difference and the second phase difference.

12 Claims, 11 Drawing Sheets

(56) References Cited

U.S. PATENT DOCUMENTS

2014/0211079 A1* 7/2014 Aoki .................. G02B 7/34
                                                                348/353

FOREIGN PATENT DOCUMENTS

| CN | 102472881 A | 5/2012 |
| --- | --- | --- |
| CN | 102833472 A | 12/2012 |
| CN | 103238098 A | 8/2013 |
| JP | 2000-156823 A | 6/2000 |
| JP | 2007-279312 A | 10/2007 |
| JP | 2011-101325 A | 5/2011 |
| KR | 10-2013-0011424 A | 1/2013 |
| WO | 2012/132122 A1 | 10/2012 |
| WO | 2013/105481 A1 | 7/2013 |

OTHER PUBLICATIONS

Chinese Office Action issued in corresponding application No. 201410551264.6 on Sep. 23, 2016.

* cited by examiner

PLAN VIEW

A-A CROSS
SECTIONAL VIEW

FIG. 6A

FIG. 6B

DETECTION APPARATUS, IMAGE PICKUP APPARATUS, IMAGE PICKUP SYSTEM, AND CONTROL METHOD OF THE DETECTION APPARATUS

BACKGROUND OF THE INVENTION

Field of the Invention

The present invention relates to an image pickup apparatus provided with an image pickup element including a focus detection pixel.

Description of the Related Art

Japanese Patent Laid-open No. 2000-156823 discloses an image pickup apparatus that performs a focus detection by a phase difference method with focus detection pixels disposed at predetermined intervals among image pickup pixels. With the configuration of Japanese Patent Laid-open No. 2000-156823, image information partly lacks at the positions of the focus detection pixels. Thus, an interpolation calculation is performed based on information of image pickup pixels around each focus detection pixel so as to generate to an image signal. Sparsely arranged focus detection pixels can reduce image degradation due to pixel defects. However, those pixels degrade sampling characteristics of a focus detection image and thus degrade focus detection performance.

Japanese Patent Laid-open No. 2007-279312 discloses an image pickup apparatus capable of performing a highly accurate focus detection and a large defocus amount detection by performing the highly accurate focus detection by using a group of first focus detection pixels having a short image detection pitch and a large defocus amount detection by using a group of second focus detection pixels having a long image detection pitch.

However, in the configuration disclosed in Japanese Patent Laid-open No. 2007-279312, the first focus detection pixels are densely arranged to highly accurately detect a nearly-focused state. A pixel signal of each focus detection pixel is generated through interpolation processing using output signals of neighboring image pickup pixels and output signals of neighboring focus detection pixels. This configuration improves sampling characteristics of the pixel signal from the focus detection pixel but potentially causes partial image degradation in a focus detection region.

SUMMARY OF THE INVENTION

The present invention provides a detection apparatus, an image pickup apparatus, and an image pickup system that are capable of performing a highly accurate focus detection through an image pickup element including a focus detection pixel, and a method of controlling the detection apparatus.

A detection apparatus as one aspect of the present invention configured to detect a focus state based on an output signal from an image pickup element capable of outputting an image pickup signal and a phase-difference detection signal includes a first calculation unit configured to calculate information related to a first phase difference based on the phase-difference detection signal output from the image pickup element, a second calculation unit configured to calculate information related to a second phase difference based on the image pickup signal output from the image pickup element, and a detection unit configured to detect the focus state based on the information related to the first phase difference and the second phase difference.

An image pickup apparatus as another aspect of the present invention includes the detection apparatus and a control unit configured to control focusing based on the focus state detected by the detection apparatus.

An image pickup apparatus as another aspect of the present invention includes the detection apparatus, the image pickup element, and a control unit configured to control focusing based on the focus state detected by the detection apparatus. An image pickup system as another aspect of the present invention includes the image pickup apparatus and a lens apparatus removably mounted on the image pickup apparatus.

A method of controlling a detection apparatus as another aspect of the present invention is a method of controlling a detection apparatus configured to detect a focus state based on an output signal from an image pickup element capable of outputting an image pickup signal and a phase-difference detection signal, the method including the steps of calculating information related to a first phase difference based on the phase-difference detection signal output from the image pickup element, calculating information related to a second phase difference based on the image pickup signal output from the image pickup element, and detecting the focus state based on the information related to the first phase difference and the second phase difference.

Further features and aspects of the present invention will become apparent from the following description of exemplary embodiments with reference to the attached drawings.

BRIEF DESCRIPTION OF THE DRAWINGS

FIGS. 6A and 6B illustrate exemplary arrangements of image pickup pixels and the focus detection pixels of the image pickup element according to the embodiment.

DESCRIPTION OF THE EMBODIMENTS

Exemplary embodiments of the present invention will be described below with reference to the accompanied drawings.

Figure 1:
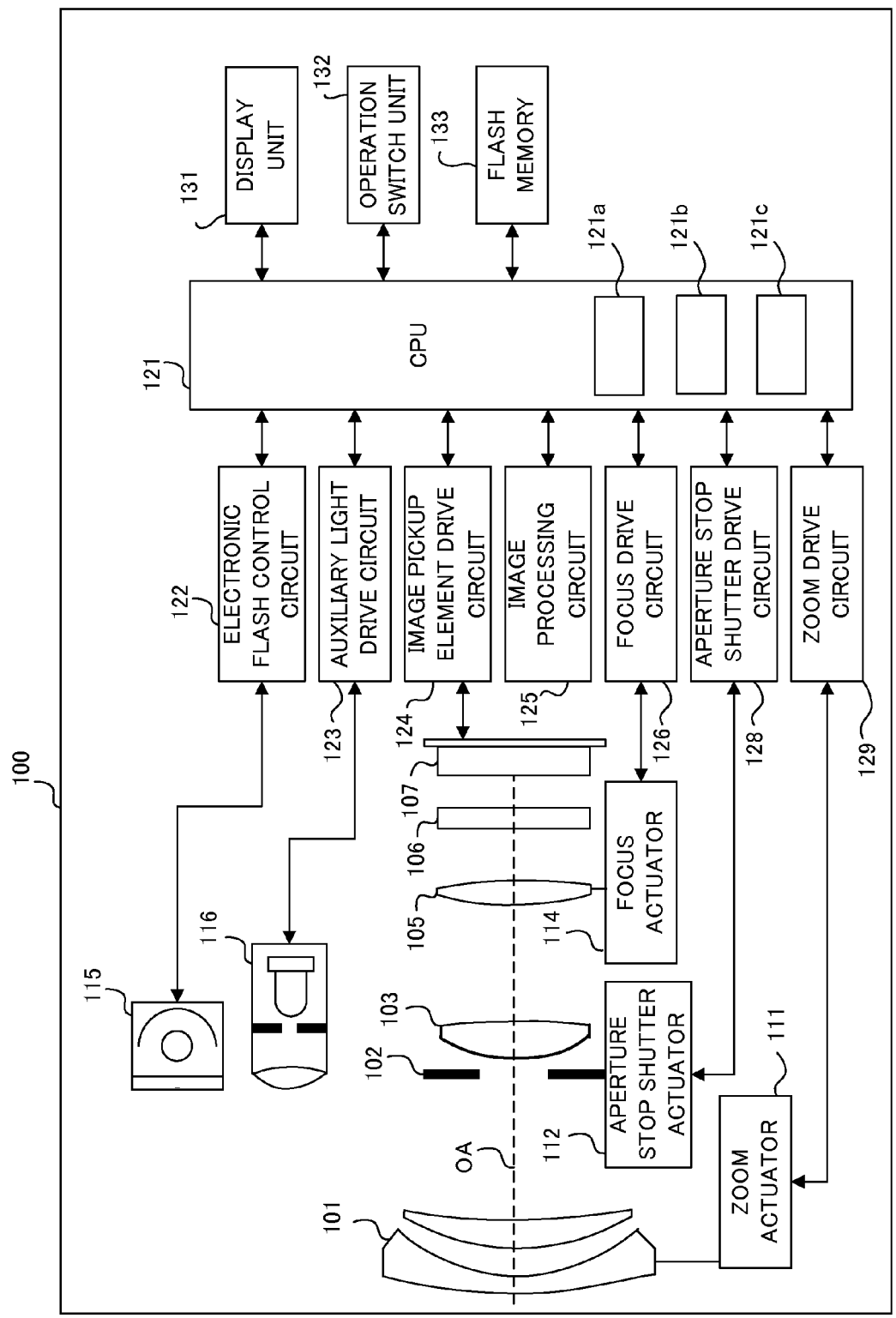
FIG. 1 is a configuration diagram of an image pickup apparatus according to an embodiment of the present invention.

First, referring to FIG. 1, an image pickup apparatus according to an embodiment of the present invention will be described. FIG. 1 is a configuration diagram of an image pickup apparatus 100 (image pickup system). The image pickup apparatus 100 is integrally constituted by an image pickup apparatus body (camera body) including an image pickup element 107, and an image pickup optical system (image pickup lens). However, the present embodiment is not limited thereto, but is applicable to an image pickup system including an image pickup apparatus body and a lens apparatus (the image pickup optical system) removably mounted on the image pickup apparatus body.

In FIG. 1, reference numeral 101 denotes a first lens unit. The first lens unit 101 is disposed at a front of the image pickup optical system (imaging optical system) and is held movable in a direction of an optical axis OA (optical axis direction). Reference numeral 102 denotes an aperture stop shutter. The aperture stop shutter 102 adjusts its opening size so as to adjust a light intensity at the time of capturing an image. The aperture stop shutter 102 serves as an exposure-time adjusting shutter at the time of capturing a still image. Reference numeral 103 denotes a second lens unit constituting the image pickup optical system. The aperture stop shutter 102 and the second lens unit 103 integrally move in the optical axis direction cooperatively with a movement operation of the first lens unit 101 to perform a magnification-varying operation (zooming). Reference numeral 105 denotes a third lens unit constituting the image pickup optical system. The third lens unit 105 moves in the optical axis direction to perform focusing. Reference numeral 106 denotes an optical lowpass filter. The optical lowpass filter 106 is an optical element for reducing false color or moire of a shot image.

Reference numeral 107 denotes the image pickup element. The image pickup element 107 performs photoelectric conversion on an object image (optical image) obtained through the image pickup optical system to output an image signal. The image pickup element 107 includes a C-MOS sensor and its peripheral circuits. The image pickup element 107 includes a two-dimensional single-plate color sensor provided with an on-chip Bayer-arrayed primary color mosaic filter formed on light-receiving pixels of m pixels in a lateral direction and n pixels in a longitudinal direction. As described later, the image pickup element 107 includes a plurality of focus detection pixels and a plurality of image pickup pixels. The focus detection pixels receive light beams passing through pupil regions of the image pickup optical system that are different from each other and output first pixel signals. The image pickup pixels receive light beams passing through the same pupil region of the image pickup optical system and output second pixel signals.

Reference numeral 111 denotes a zoom actuator. The zoom actuator 111 rotates a cam barrel (not illustrated) to drive the first lens unit 101, the second lens unit 103, and the third lens unit 105 in the optical axis direction, thereby performing a magnification-varying operation. Reference numeral 112 denotes an aperture stop shutter actuator. The aperture stop shutter actuator 112 controls the opening size of the aperture stop shutter 102 to adjust the light intensity at the image capcuturing and performs exposure time control at the still image capturing. Reference numeral 114 denotes a focus actuator. The focus actuator 114 drives the third lens unit 105 (focus lens) in the optical axis direction to perform focusing.

Reference numeral 115 denotes an electronic flash (illumination unit) for object illumination at the image capturing. The electronic flash 115 is preferably a flash lighting device including a xenon tube, but may be an illumination apparatus including an LED that continuously emits light. Reference numeral 116 denotes an AF auxiliary light unit. The AF auxiliary light unit 116 projects a mask image having a predetermined opening pattern onto a field through a projection lens so as to improve a focus detection capability for a dark object or a low-contrast object.

Reference numeral 121 denotes a CPU (camera controller). The CPU 121 is a camera CPU that performs various kinds of control of the camera body, and includes a calculation unit, a ROM, a RAM, an A/D convertor, a D/A convertor, a communication interface circuit, and the like. The CPU 121 drives various circuits in the camera body based on a predetermined program stored in the ROM so as to execute series of operations such as AF, image capturing, image processing, and recording. The CPU 121 serves as a detection apparatus configured to detect a focus state based on output signals from the image pickup element 107 capable of outputting an image pickup signal and a phase-difference detection signal. To achieve this function, the CPU 121 includes a first evaluation value calculation unit 121a (first calculation unit), a second evaluation value calculation unit 121b (second calculation unit), and a focus detection unit 121c (detection unit). The first calculation unit and the second calculation unit may share the same calculation circuit. Specific operations of those units will be described later.

Reference numeral 122 denotes an electronic flash control circuit. The electronic flash control circuit 122 controls lighting of the electronic flash 115 in synchronization with an image pickup operation. Reference numeral 123 denotes an auxiliary light drive circuit. The auxiliary light drive circuit 123 controls lighting of the AF auxiliary light unit 116 in synchronization with a focus detection operation. Reference numeral 124 denotes an image pickup element drive circuit. The image pickup element drive circuit 124 controls an image pickup operation of the image pickup element 107 and A/D converts an image signal output from the image pickup element 107 to output the converted image signal to the CPU 121. Reference numeral 125 denotes an image processing circuit. The image processing circuit 125 performs image processing including γ(gamma) conversion, color interpolation, and JPEG compression on the image signal obtained from the image pickup element 107.

Reference numeral 126 denotes a focus drive circuit (control unit). The focus drive circuit 126 performs drive control of the focus actuator 114 based on a focus detection result and moves the third lens unit 105 in the optical axis direction to perform focusing. In other words, the focus drive circuit 126 (control unit) controls focusing based on a focus state detected by the CPU 121 (detection apparatus). Reference numeral 128 denotes an aperture stop shutter drive circuit. The aperture stop shutter drive circuit 128 performs drive control of the aperture stop shutter actuator 112 to control the opening of the aperture stop shutter 102. Reference numeral 129 denotes a zoom drive circuit. The zoom drive circuit 129 drives the zoom actuator 111 in response to a zoom operation by a photographer.

Reference numeral 131 denotes a display unit such as an LCD. The display unit 131 displays information of an image capturing mode of the camera body, a preview image before image capturing and a check image after image capturing, and a focus state displaying image at focus detection. Reference numeral 132 denotes an operation switch unit. The operation switch unit 132 is constituted by a power switch, a release (image capturing trigger) switch, a zoom operation switch, and an image capturing mode selecting switch. Reference numeral 133 denotes a detachable flash memory. The flash memory 133 records a captured image.

Figure 2:
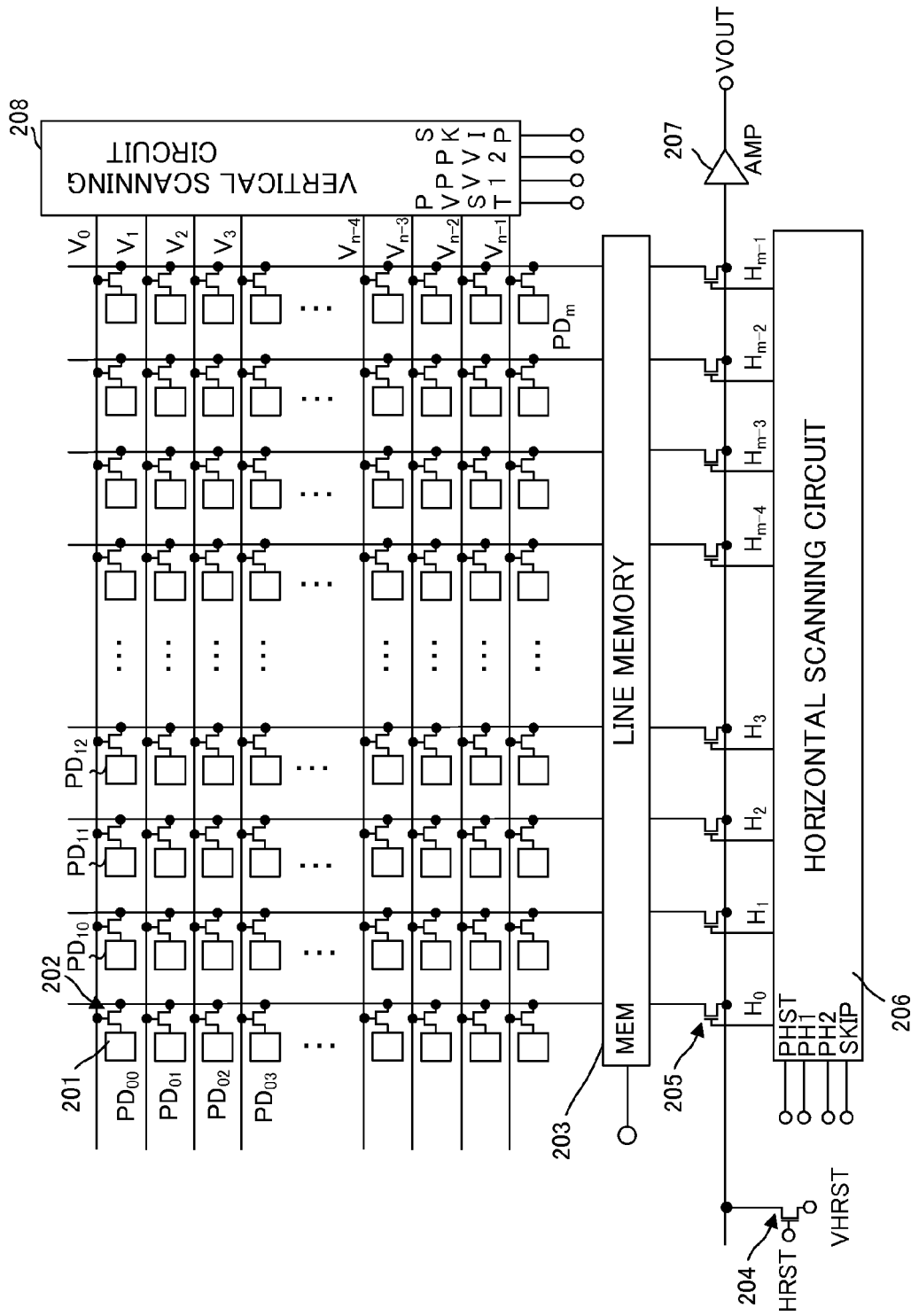
FIG. 2 is a block diagram of an image pickup element (solid-state image pickup element) according to the embodiment.

FIG. 2 is a block diagram of the image pickup element 107 (solid-state image pickup element). The block diagram in FIG. 2 illustrates a minimum configuration needed to describe a reading operation of an image signal, and a pixel reset signal and the like are omitted in FIG. 2. In FIG. 2, reference numeral 201 denotes a photoelectric conversion portion (photoelectric converter) (hereinafter, referred to as "$PD_{mn}$" where m represents X-directional address of m=0, 1, ..., m−1, and n represents Y-directional address of n=0, 1, ..., n−1.) that includes a photodiode, a pixel amplifier, and a reset switch. The image pickup element 107 according to the present embodiment includes two-dimensionally arranged m×n photoelectric conversion portions. For simplification, reference numerals are shown only near an upper-left photoelectric conversion portion $PD_{00}$.

Reference numeral 202 denotes a switch for selecting an output of the photoelectric conversion portion 201 ($PD_{mn}$), and the selection is performed for each row by a vertical scanning circuit 208. Reference numeral 203 denotes a line memory (MEM) that temporarily stores the output of the photoelectric conversion portion 201 ($PD_{mn}$) for each row selected by the vertical scanning circuit 208. The line memory 203 is typically a capacitor.

Reference numeral 204 denotes a switch connected to a horizontal output line and used for resetting the horizontal output line to a predetermined potential VHRST under control of a signal HRST. Reference numeral 205 denotes switches ($H_0$ to $H_{m-1}$) for sequentially outputting the output of the photoelectric conversion portion 201 ($PD_{mn}$) stored in the line memory 203 to the horizontal output line. The switches 205 ($H_0$ to $H_{m-1}$) are sequentially scanned by a horizontal scanning circuit 206 described later to read out photoelectric conversion outputs for each row.

Reference numeral 206 denotes a horizontal scanning circuit that sequentially outputs the output of the photoelectric conversion portion 201 stored in the line memory 203 to the horizontal output line. A signal PHST is a data input to the horizontal scanning circuit 206, and PH1 and PH2 denote shift clock inputs: data is set when PH1 is at an "H" level, and data is latched when PH2 is at the "H" level. Inputting shift clocks to the shift clock inputs PH1 and PH2 sequentially shifts the signal PHST, thereby sequentially turning the switches 205 ($H_0$ to $H_{m-1}$) on. A signal SKIP is a control input signal used to perform setting for skip reading. Setting the signal SKIP to an "H" level enables the horizontal scanning circuit 206 to skip at a predetermined interval. Reference numeral 207 denotes an amplifier AMP that amplifies a signal through the horizontal output line and outputs the amplified signal to a terminal VOUT.

Reference numeral 208 denotes the vertical scanning circuit that performs sequential scanning to output control signals $V_0$ to $V_{n-1}$, thereby selecting the selection switches 202 of the photoelectric conversion portions 201 ($PD_{mn}$). The control signals are, in the same manner as with the horizontal scanning circuit 206, controlled by data inputs such as a signal PVST, shift clocks PV1 and PV2, and the signal SKIP for setting the skip reading. The operation of the horizontal scanning circuit 206 is the same as that of the horizontal scanning circuit 206 in detail, and thus a description thereof will be omitted.

FIGS. 3A to 5D are diagrams for explaining the structures of the image pickup pixels and the focus detection pixels. The present embodiment employs a Bayer array of four pixels of 2×2 with two diagonal pixels having a spectral sensitivity to G (green) and the other two pixels respectively having spectral sensitivities to R (red) and B (blue). The focus detection pixels each having a structure described later are distributed between such Bayer arrays by a predetermined rule.

Figure 3A:
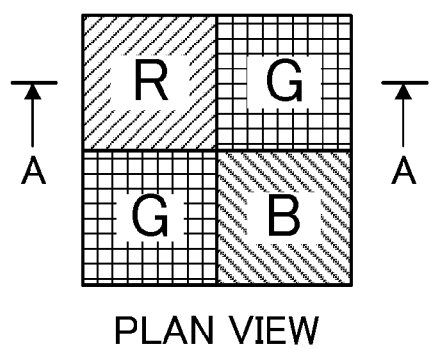
FIGS. 3A and 3B are a plan view and a cross-sectional view of image pickup pixels of the image pickup element, respectively, according to the embodiment.
Figure 3B:
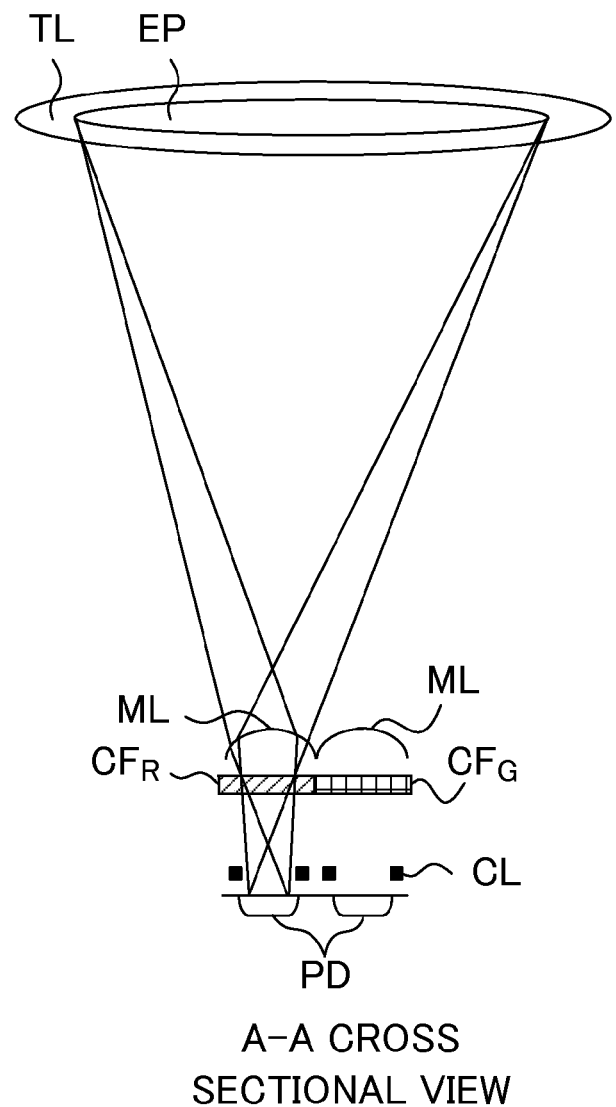

FIGS. 3A and 3B illustrate the arrangement and structure of the image pickup pixels. FIG. 3A is a plan view of the 2×2 image pickup pixels. As publicly known, the Bayer array has G pixels as its diagonal pixels and R and B pixels as the other two pixels. This 2×2 structure is repeatedly arranged.

FIG. 3B is a cross-sectional view illustrating a section A-A in FIG. 3A. ML denotes an on-chip micro lens disposed on a top surface of each pixel, CFR denotes an R (red) color filter, and CFG denotes a G (green) color filter. PD denotes a schematic illustration of a photoelectric conversion portion of a C-MOS sensor, and CL denotes a wiring layer including signal lines for transferring various signals in the C-MOS sensor. TL denotes a schematic illustration of the image pickup optical system.

The on-chip micro lens ML and the photoelectric conversion portion PD of the image pickup pixel are configured to receive as effectively as possible a light beam passing through the image pickup optical system TL. In other words, it is designed that an exit pupil EP of the image pickup optical system TL and the photoelectric conversion portion PD are conjugate to each other through the micro lens ML and that the photoelectric conversion portion PD has a large effective area. Although FIG. 3B illustrates a light beam incident on a G pixel, the same configuration applies to an R pixel and a B pixel. Thus, the exit pupil EP for all of the image pickup pixels of RGB has a large diameter to allow effective reception of a light beam from an object, thereby improving an image signal S/N ratio.

Figures 4A, 4B:
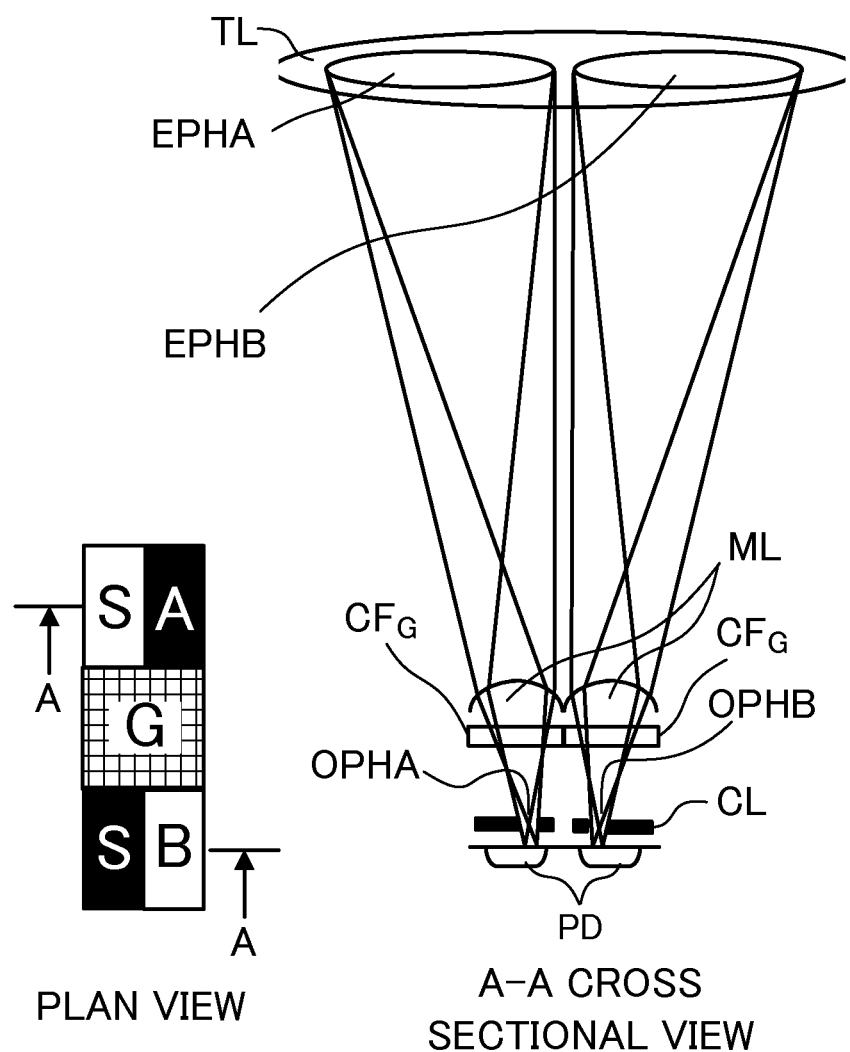
FIGS. 4A and 4B are a plan view and a cross-sectional view of focus detection pixels of the image pickup element, respectively, according to the embodiment.

FIGS. 4A and 4B illustrate the arrangement and structure of the focus detection pixels for pupil division in a horizontal direction (lateral direction) of the image pickup optical system. The horizontal direction (lateral direction) is a direction orthogonal to the optical axis of the image pickup optical system and extending horizontally when the camera is positioned such that the optical axis is horizontal. FIG. 4A is a plan view of 2×2 pixels including the focus detection pixels. When an image signal is acquired for recording or viewing, the G pixel acquires a main component of luminance information. Since the image recognition characteristic of a human being is sensitive to luminance information, lack of the G pixel is likely to be recognized as image degradation. On the other hand, the R pixel and the B pixel are pixels for acquiring color information (color difference information). Since the visual perception characteristic of a human being is insensitive to the color information, lack of a few pixels for acquiring the color information is unlikely to be recognized as image degradation. For this reason, in the present embodiment, of the 2×2 pixels, the G pixels remain as the image pickup pixels, and the R and B pixels are replaced with the focus detection pixels. These focus detection pixels are denoted as SA and SB in FIG. 4A.

FIG. 4B is a cross-sectional view illustrating a section A-A in FIG. 4A. The micro lens ML and the photoelectric conversion portion PD have the same structures as those for the image pickup pixels illustrated in FIG. 3B. In the present embodiment, the focus detection pixels are each constituted by the color filter $CF_G$ (green) of the G pixel arranged at the position of the B pixel. For pupil division at the image pickup element 107, an opening of the wiring layer CL is located (displaced) to one side with respect to the central line of the micro lens ML. Specifically, an opening OPHA of the pixel SA is located to the right side and thus receives a light beam passing through a left exit pupil EPHA of the image pickup optical system TL. Similarly, an opening OPHB of the pixel SB is located to the left side and thus receives a light beam passing through a right exit pupil EPHB of the image pickup optical system TL. The pixels SA are regularly arranged in the horizontal direction, and an object image acquired by those pixels is referred to as image A. Similarly, the pixels SB are regularly arranged in the horizontal direction, and an object image acquired by those pixels is referred to as image B. The relative positions of the image A and the image B are detected and an image shift amount thereof is multiplied by a conversion coefficient to calculate a focus shift amount (defocus amount) of the object image.

As described above, the opening (FIG. 3B) of the photoelectric conversion portion PD that outputs an image pickup signal is larger than the opening (openings OPHA and OPHB in FIG. 4B) of the photoelectric conversion portion PD that outputs a phase-difference detection signal). The image pickup element 107 outputs phase-difference detection signals from photoelectric conversion portions with divided exit pupils.

Figure 5A:
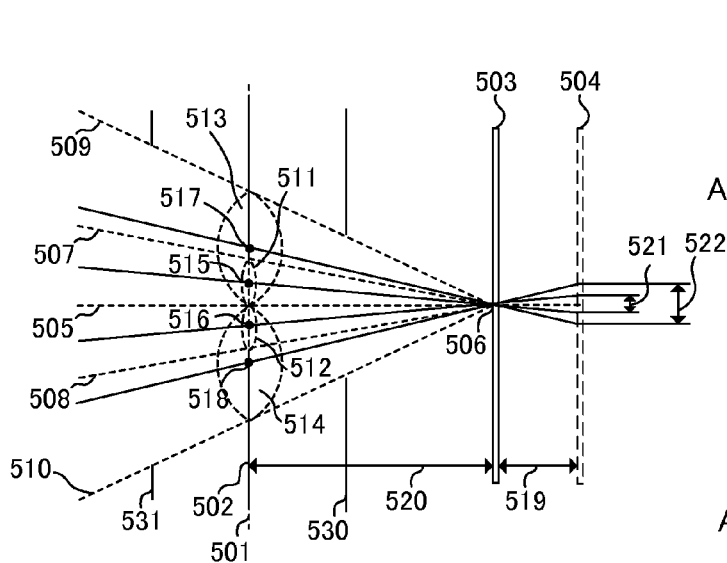
FIGS. 5A-5D are explanatory diagrams of vignetting of a focus detection pixel and a center of gravity distance of focus detection light beams according to the embodiment.

Next, a method of obtaining the conversion coefficient for calculating the defocus amount from the image shift amount will be described. The conversion coefficient is calculated based on the opening diameter of the imaging optical system and the sensitivity distributions of the focus detection pixels. An image sensor (the image pickup element 107) receives a light beam narrowed by components such as a lens holding frame of the image pickup optical system TL and the aperture stop shutter 102. FIGS. 5A-5D illustrate focus detection light beams narrowed due to vignetting of the image pickup optical system. FIGS. 5A-5D illustrate narrowing of the light beams incident on pixels near the center of the image sensor by an aperture stop 502 of the imaging optical system at the position of an exit pupil surface 501. In FIG. 5A, reference numerals 503 and 504 denote image sensors (503 denotes an image sensor at an expected imaging plane position), reference numeral 505 denotes the optical axis, and reference numeral 506 denotes the position of the optical axis on the image sensor 503. Reference numerals 507 and 508 denote light beams narrowed by the aperture stop 502 (light beams when the aperture stop 502 is narrowed), and 509 and 510 denote light beams not narrowed by the aperture stop 502 (light beams when the aperture stop 502 is open). Reference numerals 511 and 512 respectively denote focus detection light beams for the light beams 507 and 508. Reference numerals 515 and 516 respectively denote center of gravity positions of the focus detection light beams 511 and 512. Similarly, reference numerals 513 and 514 respectively denote focus detection light beams for light beams 509 and 510. Reference numerals 517 and 518 respectively denote center of gravity positions of the focus detection light beams 513 and 514. Reference numeral 530 denotes a lens holding frame closest to the image sensor, and reference numeral 531 denotes a lens holding frame closest to the object.

Figure 5B:
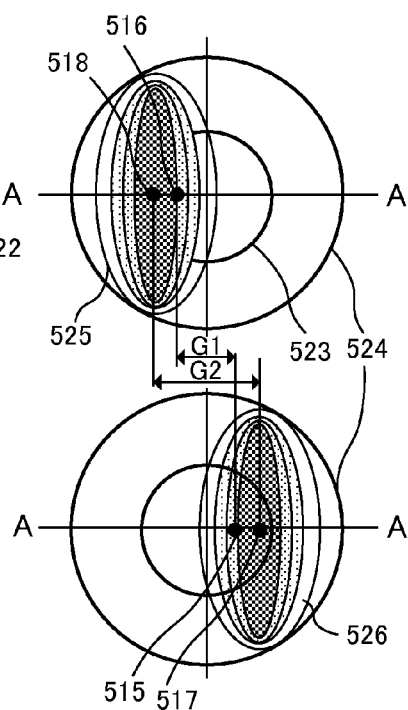

FIG. 5B is an explanatory diagram of a center of gravity position change caused by vignetting on the exit pupil surface 501 of the focus detection pixel at the center of the image sensor. In FIG. 5B, reference numerals 523 and 524 respectively denote pupil regions of the narrowed light beams 507 and 508 and the not-narrowed light beams 509 and 510 incident on a pixel at the center of the image sensor 504. Reference numerals 525 and 526 respectively denote incident angle characteristics of the focus detection pixels SA and SB. The focus detection pixels SA and SB respectively receive light beams passing through the pupil regions 523 and 524 and having sensitivity distributions as illustrated with the incident angle characteristics 525 and 526. Thus, calculation of the centers of the distributions of focus detection light beams passing through the pupil regions 523 and 524 enables calculation of a distance between the centers when the focus detection light beams are narrowed (the aperture stop is narrowed) and when the focus detection light beams are not narrowed (the aperture stop is open). Then, the distance between the centers are used to calculate a base length thereof. The conversion coefficient for calculating the defocus amount from the image shift amount can be obtained by previously measuring or calculating the sensitivity distributions of the focus detection pixels and the opening diameter of the imaging optical system and storing them.

In FIG. 5A, the defocus amount 519 is denoted by DEF, and a distance 520 from the image sensor 503 to the exit pupil surface 501 is denoted by L. The base lengths (center of gravity distances) when the focus detection light beams are narrowed and when the focus detection light beams are not narrowed are respectively denoted by G1 (distance between the center of gravity positions 515 and 516) and G2 (distance between the center of gravity positions 517 and 518). The image shift amounts 521 and 522 are respectively denoted by PRED1 and PRED2, and the conversion coefficients used to convert the respective image shift amounts 521 and 522 into the defocus amount DEF are denoted by K1 and K2. The defocus amount DEF can be calculated by Expression (1) below.

$$DEF = K1 \times PRED1 = K2 \times PRED2 \quad (1)$$

The conversion coefficients K1 and K2 for converting the image shift amounts 521 and 522 into the defocus amount DEF are respectively calculated by Expressions (2) and (3) below.

$$K1 = L/G1 \quad (2)$$

$$K2 = L/G2 \quad (3)$$

The relation K1<K2 holds. For an equivalent error generated in a calculated image shift amount, the defocus amount has K2/K1-fold error when the aperture stop is narrowed as compared to when the aperture stop is narrowed.

Figures 5C, 5D:
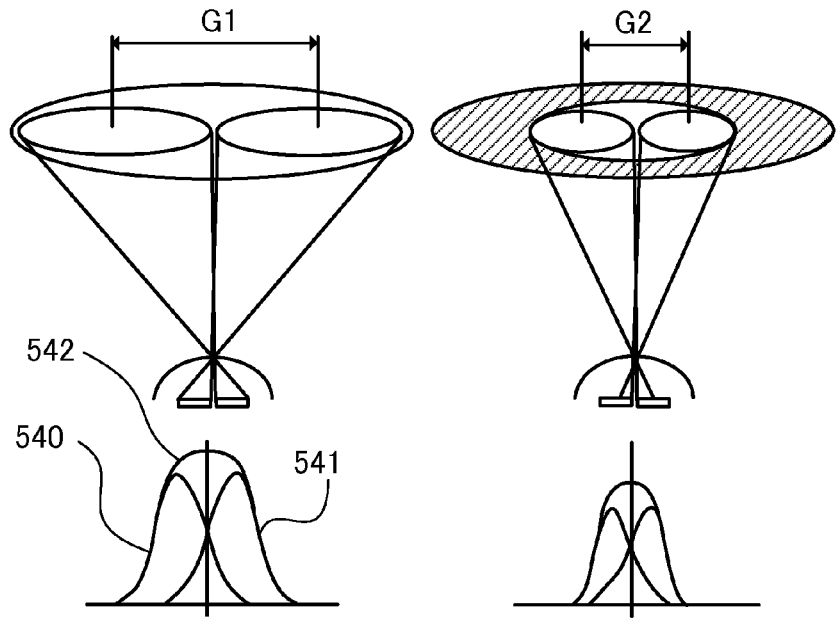

FIGS. 5C and 5D are cross-sectional views of sections A-A of the sensitivity distributions in FIG. 5B. FIGS. 5C and 5D illustrate sensitivity distributions of the image A pixel 540, the image B pixel 541, and an image pickup pixel 542 when the aperture stop is open and when the aperture stop is narrowed. In each of FIGS. 5C and 5D, a horizontal axis represents a light incident angle, and a vertical axis represents the sensitivity distribution. Comparison between FIGS. 5C and 5D shows that the base length is longer and the sensitive range of the incident angle is larger when the aperture stop is open. Since the base length and the image shift amount between the image A and the image B corresponding to defocus are proportional to each other, the image shift amount is more sensitive to defocus when the base length is larger. A large sensitive range of the incident angle leads to more blur and image vignetting of the image A and the image B due to defocus. Typically, an image signal from the focus detection pixel is desired to have the image shift amount highly sensitive to defocus and have less blur and image vignetting for the defocus.

Figures 6A, 6B:
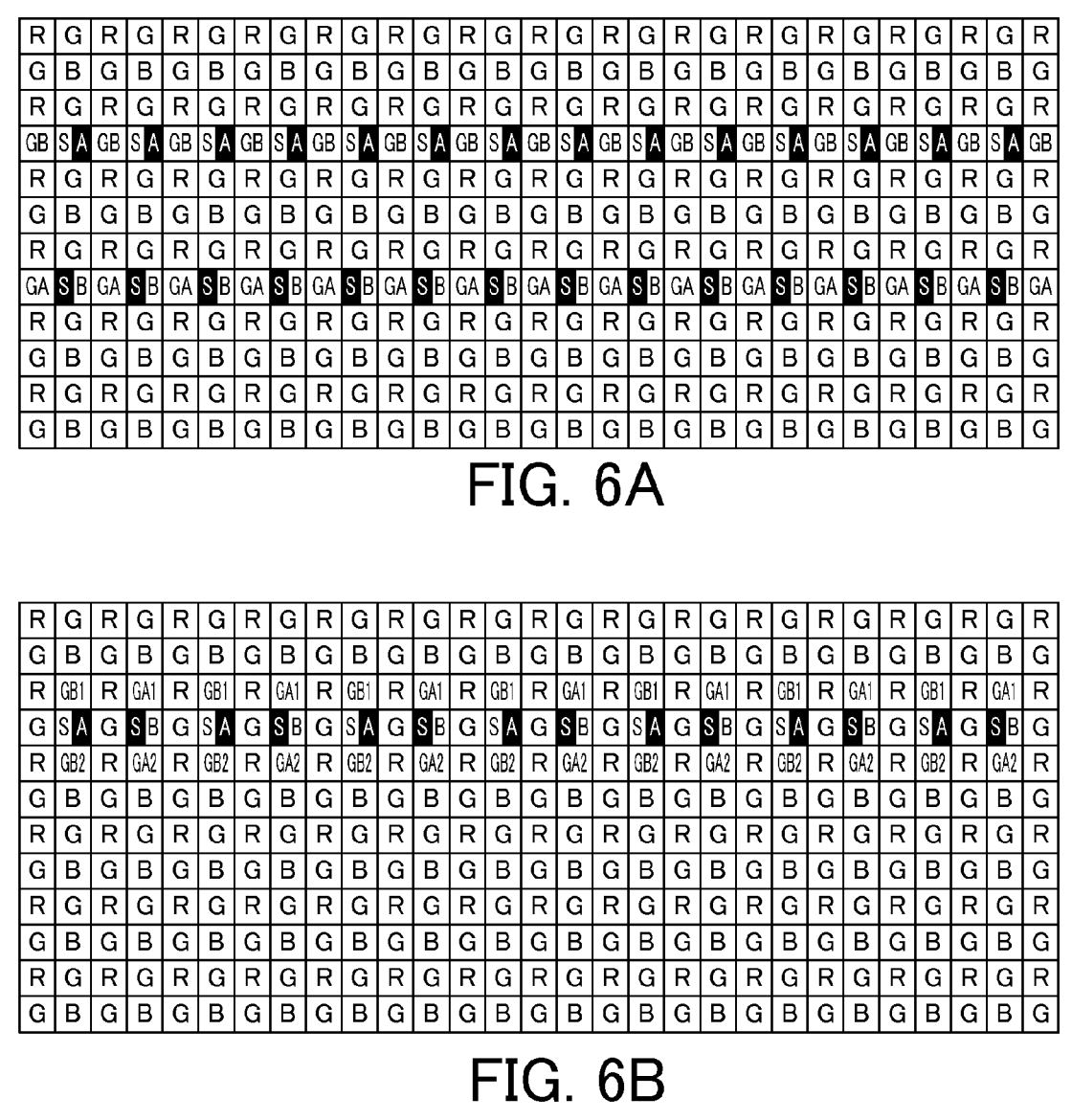

FIGS. 6A and 6B are diagrams of an exemplary arrangement of the image pickup pixels and the focus detection pixels in the image pickup element 107. In FIGS. 6A and 6B, symbols G, GA, and GB denote pixels each having a green color filter (green filter), symbol R denotes a pixel having a red color filter (red filter), and symbol B denotes a pixel having a blue color filter (blue filter). In FIGS. 6A and 6B, symbol SA denotes the focus detection pixels whose pixel portions each have a horizontal one-sided opening and that constitute a reference pixel group for detecting a horizontal image shift amount relative to the focus detection pixels described later. Symbol SB denotes the focus detection pixels whose pixel portions each have an opening horizontally one-sided in a direction opposite to that of the focus detection pixel SA, and that constitute a reference pixel group for detecting the horizontal image shift amount relative to the focus detection pixels SA. Uncolored portions of the focus detection pixels SA and SB represent the opening positions of the one-sided pixels.

A highly accurate detection of a nearly-focused state requires a dense arrangement of the focus detection pixels. However, an image signal (pixel signal) at the position of a focus detection pixel needs to be generated through interpolation processing based on output signals of neighboring image pickup pixels and an output signal of the focus detection pixel. Thus, the focus detection pixels are required to be sparsely arranged to reduce image degradation. In FIGS. 6A and 6B, in order to reduce image degradation, the focus detection pixels SA and SB are each arranged at the position of the B pixel whose lack is not easily recognized as image degradation.

FIGS. 6A and 6B illustrate exemplary dense arrangements of the focus detection pixels SA and SB at the positions of the B pixels to achieve a focus detection accuracy. In the following, a focus detection error caused depending on the arrangement of the focus detection pixels will be described for each of the arrangements illustrated in FIGS. 6A and 6B.

Figure 7A:
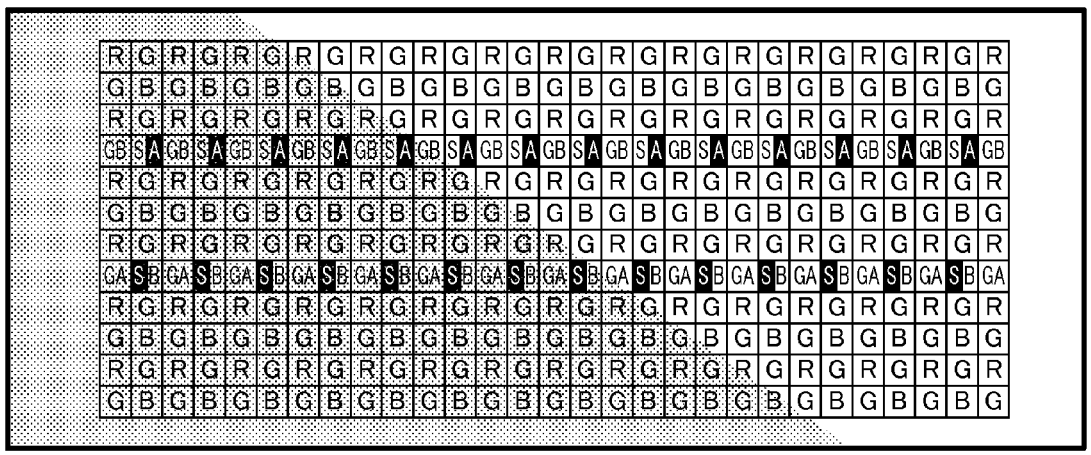
FIGS. 7A-7C illustrate an arrangement of the focus detection pixels and output waveforms of each pixel according to the embodiment.
Figure 7B:
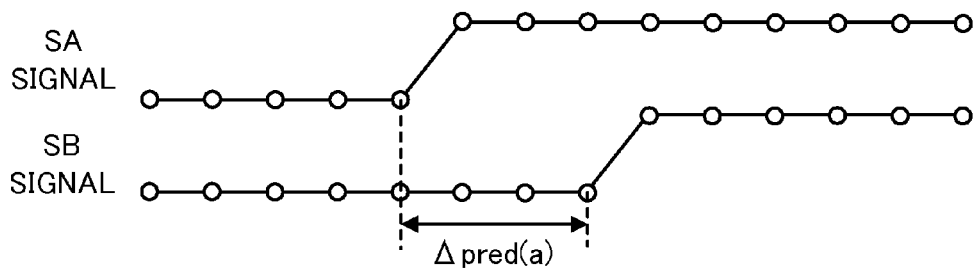
Figure 7C:
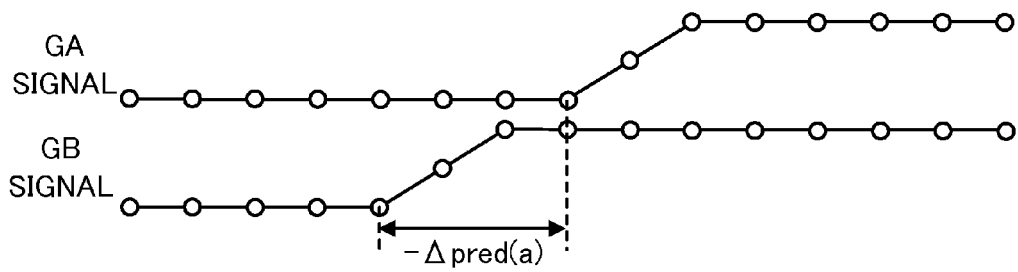
Figure 8A:
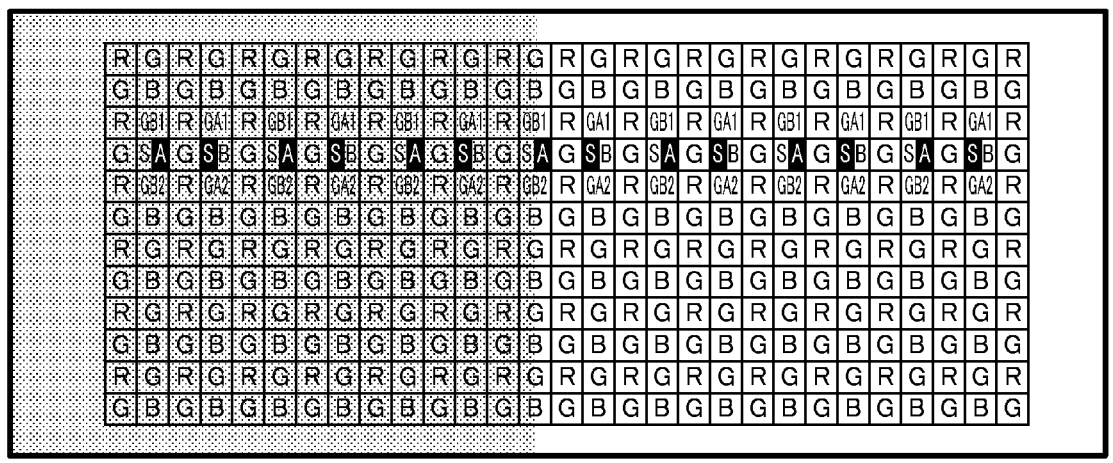
FIGS. 8A-8C illustrate an arrangement of the focus detection pixels and output waveforms of each pixel according to the embodiment.

FIGS. 7A-7C and FIGS. 8A-8C are diagrams when a monochrome edge object is imaged in focus with the arrangements of the focus detection pixels in FIGS. 6A and 6B. FIGS. 7A and 8A each illustrate the position of the object, FIGS. 7B and 8B each illustrate signals of the focus detection pixels SA and SB, and FIGS. 7C and 8C each illustrate signals of the image pickup pixels neighboring the focus detection pixel.

In FIG. 6A, the interval of two focus detection pixels (two focus detection pixels SA closest to each other or two focus detection pixels SB closest to each other) is a pitch of two pixels. As described above, the arrangement illustrated in FIG. 6A has densely arranged focus detection pixels, and the focus detection pixels SA and SB are arranged in different rows. Thus, as illustrated in FIGS. 7A-7C, when a sloped monochrome edge object is imaged through the focus detection pixels, a shift amount Δpred (a) of the image B with respect to the image A is generated as an image shift detection error that is an image shift component other than the image shift amount between the image A and the image B that would be detected depending on the defocus amount.

In the present embodiment, the generation of the image shift detection error Δpred (a) described above is reduced by correcting the image shift amount based on image pickup pixels neighboring a focus detection pixel. Thus, signals contributive to calculation of information of a second phase difference are output signals from pixel portions neighboring (around) a pixel portion that outputs a plurality of phase-difference detection signals. A photoelectric conversion portion that outputs an image pickup signal is adjacent to a photoelectric conversion portion that outputs a phase-difference detection signal. The image pickup pixels neighboring (around) the focus detection pixel may be not only image pickup pixels adjacent to the focus detection pixel but also image pickup pixels close to the focus detection pixel.

FIG. 7C illustrates signals of the Green image pickup pixels GB and GA arranged between the focus detection pixels SA and SB in FIG. 7A. In FIG. 7C, the image shift amount obtained from the image pickup pixels GA and GB is calculated to be −Δpred (a) when the image shift amount of the image pickup pixel GB with respect to the image pickup pixel GA is detected. Since the image pickup pixels GA and GB have the same pupil shape, the image shift amount between the images A and B corresponding to defocus is not generated, and only an object shift component between rows in which the focus detection pixels SA and SB are arranged can be detected with the opposite sign.

The image shift amount between SA and SB signals in FIG. 7B is denoted by PRED (SA, SB), and the image shift amount between GA and GB signals in FIG. 7C is denoted by PRED (GA, GB). The image shift amount PRED, which corresponds to the defocus amount between the image A and the image B that are respectively constituted by pixel signals of the focus detection pixels SA and SB, is calculated by Expression (4) below. In this manner, a detection error in the image shift amount due to pixel arrangement can be corrected.

$$PRED=PRED(SA,SB)+PRED(GA,GB) \quad (4)$$

Figures 8B, 8C:
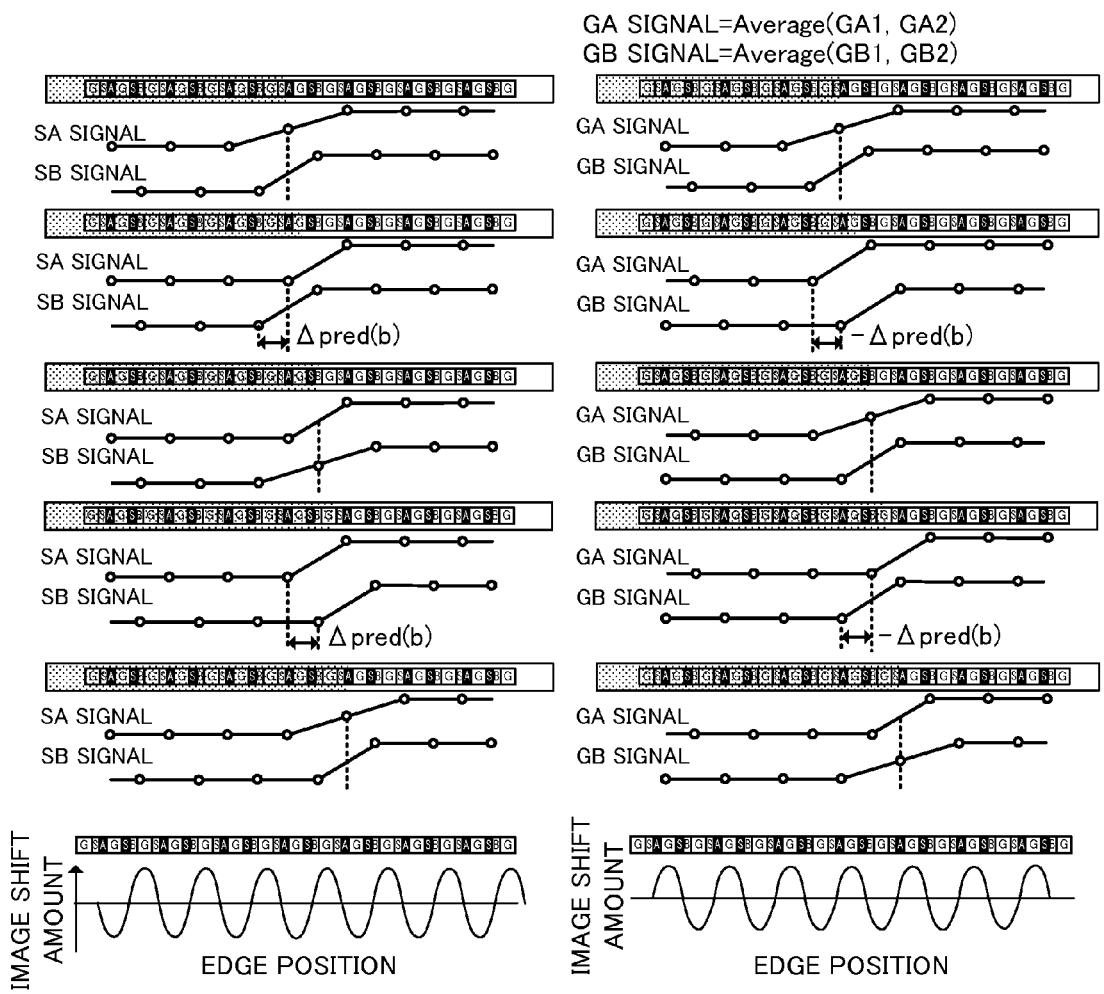

In FIG. 6B, the focus detection pixels SA and SB are arranged in the same row, and arrangement intervals between the focus detection pixels SA and between the focus detection pixels SB are four pixels each. FIG. 8B illustrates a pixel signal (SA signal) of the focus detection pixel SA, a pixel signal (SB signal) of the focus detection pixel SB, and an image shift amount change depending on the position of the object when the position of an edge object on the arrangement illustrated in FIG. 6B is varied in units of pixels. As illustrated in FIG. 8B, the position of an edge portion of the object on the arrangement of the focus detection pixels SA and SB relatively changes with respect to the focus detection pixels SA and SB. Thus, the detected image shift amount relatively changes accordingly. The bottom diagram of FIG. 8B illustrates the image shift amount at the positions of the edge portion of the object and illustrates that an image blur detection error Δpred(b) is generated depending on the position.

In the present embodiment, the generation of the image shift amount detection error Δpred(b) described above is reduced by correcting the image shift amount based on image pickup pixels neighboring a focus detection pixel. In FIG. 8A, an average output of the Green image pickup pixels GB1 and GB2 arranged above and below a focus detection pixel SA is referred to as a GB signal, and an average output of image pickup pixels GA1 and GA2 arranged above and below a focus detection pixel SB is referred to as a GA signal. FIG. 8C illustrates an image shift amount change detected from the GA signal and the GB signal at the positions of the edge portion of the object. FIGS. 8B and 8C show that an image shift amount between the SA and SB signals and an image shift amount between the GA and GB signals can be detected with opposite signs to each other. The image shift amount between the SA signal and the SB signal in FIG. 8B is denoted by PRED (SA, SB), and the image shift amount between the GA signal and the GB signal in FIG. 8C is denoted by PRED (GA, GB). The image shift amount PRED between pixel signals (an A image signal and a B image signal) from the focus detection pixels SA and SB corresponding to the defocus amount is calculated by Expression (5) below. In this manner, the image shift amount detection error due to the arrangement of the focus detection pixel can be corrected.

$$PRED=PRED(SA,SB)+PRED(GA,GB) \quad (5)$$

FIGS. 8A-8C illustrate a state in which the object is in focus, that is, a shift amount of a pair of focus detection signals is ideally zero. Next, a correction effect when defocus is generated will be described.

When the object is out of focus, image signals from a pair of focus detection pixels have an image shift corresponding to the defocus amount. Thus, relative object positions indicated by the SA signal and the SB signal change. Accordingly, a phase relation in FIG. 8B when the detection error of the image shift amount is generated changes. In contrast, the GA signal and the GB signal results from image capturing with the same pupil shape. Thus, an image shift between two images corresponding to the defocus is not generated, and the phase relation in FIG. 8C is maintained. Therefore, the correction effect of the image shift amount detection error by Expression (5) degrades depending on the defocus amount.

On the other hand, the image shift amount detection error in FIG. 8B is generated because the edge portion of the object cannot be located between focus detection pixels. For this reason, when the sharpness of the object image decreases due to defocus, the edge portion of the object can be located with an arrangement interval between the focus detection pixels. Since the absolute value of the image shift amount detection error decreases, the image shift amount detection error can be reduced by Expression (5).

Figure 9:
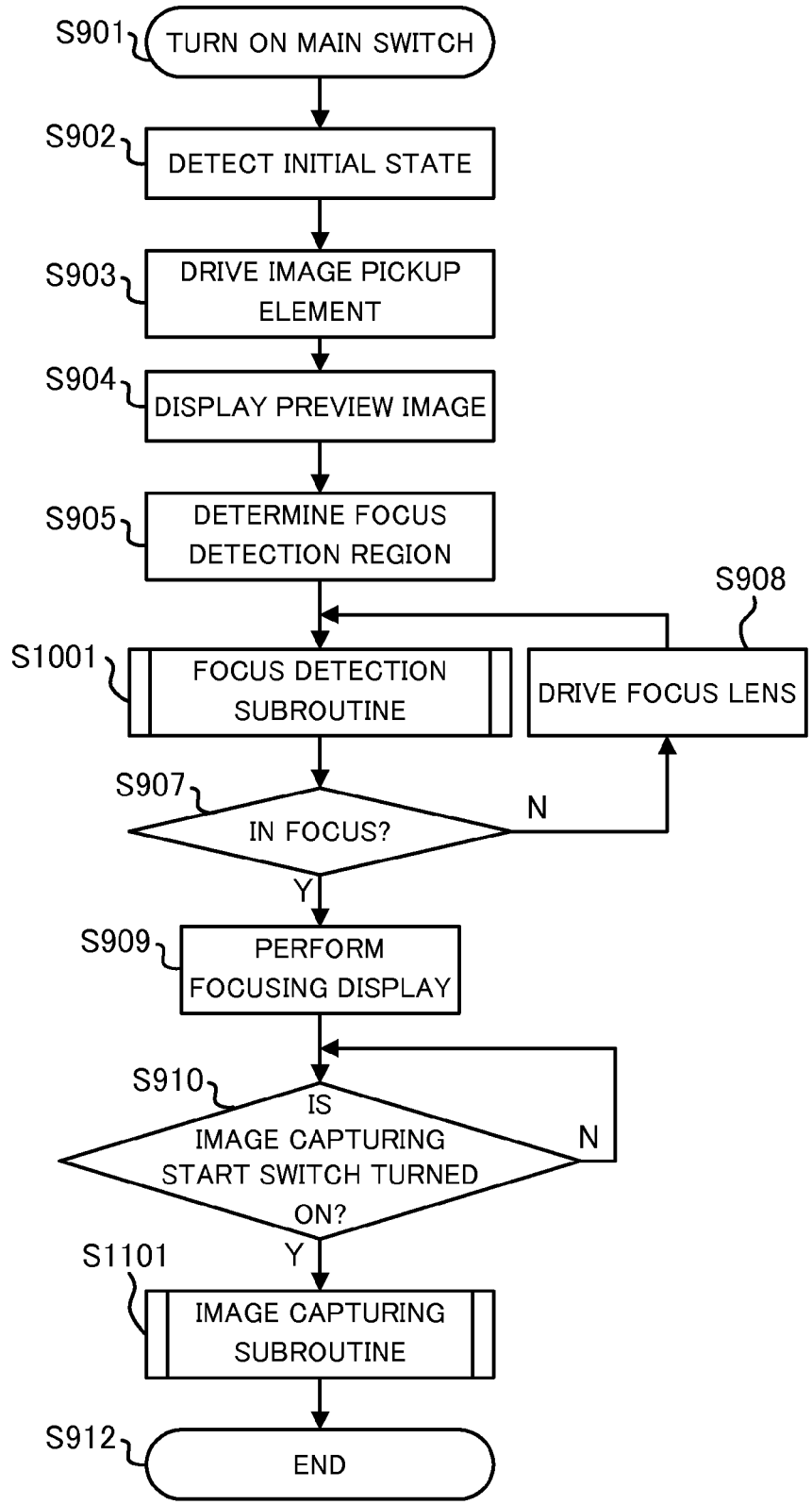
FIG. 9 is a flowchart illustrating an operation of the image pickup apparatus according to the embodiment.
Figure 10:
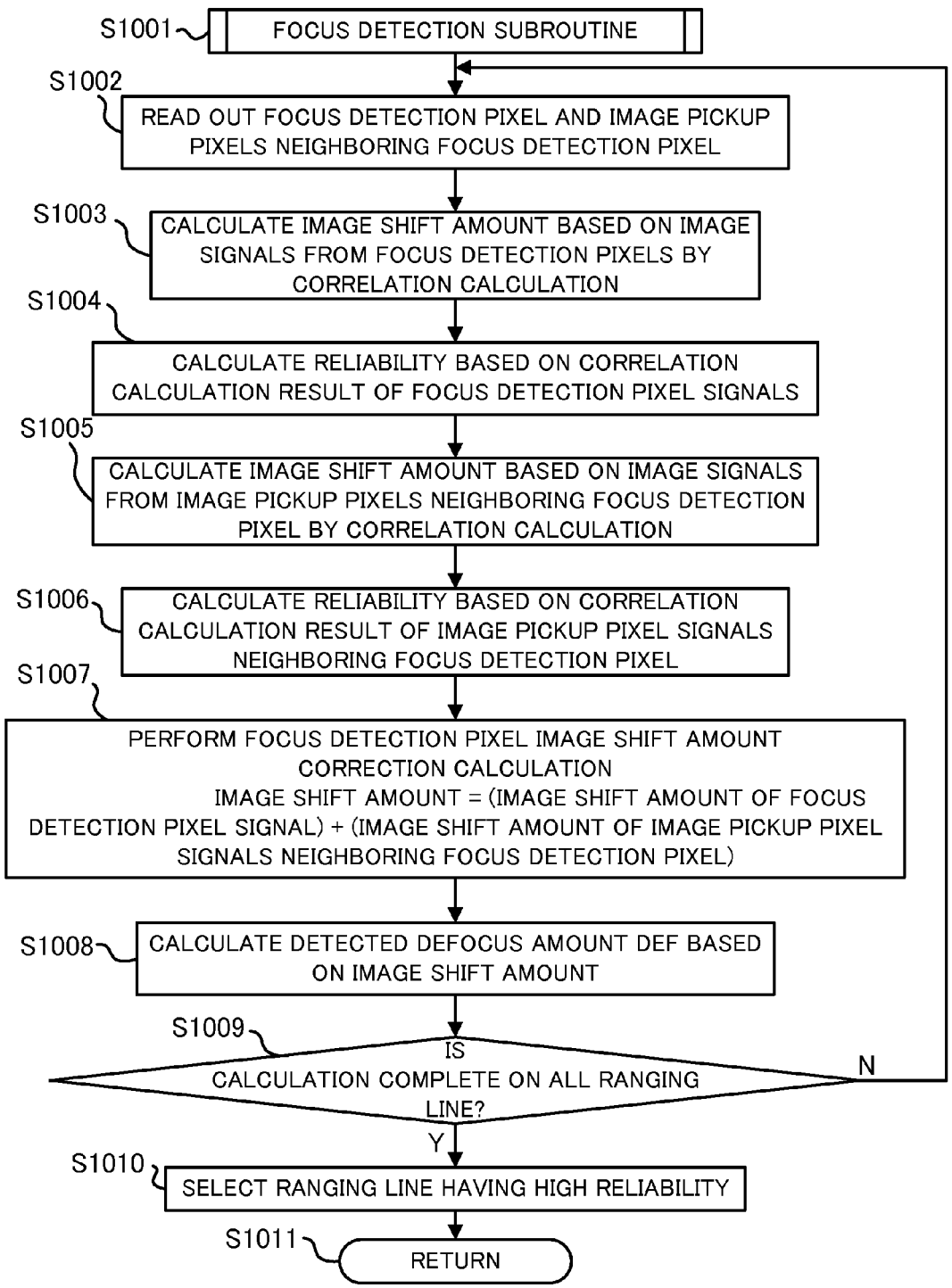
FIG. 10 is a flowchart illustrating a focus detection operation of the image pickup apparatus according to the embodiment.
Figure 11:
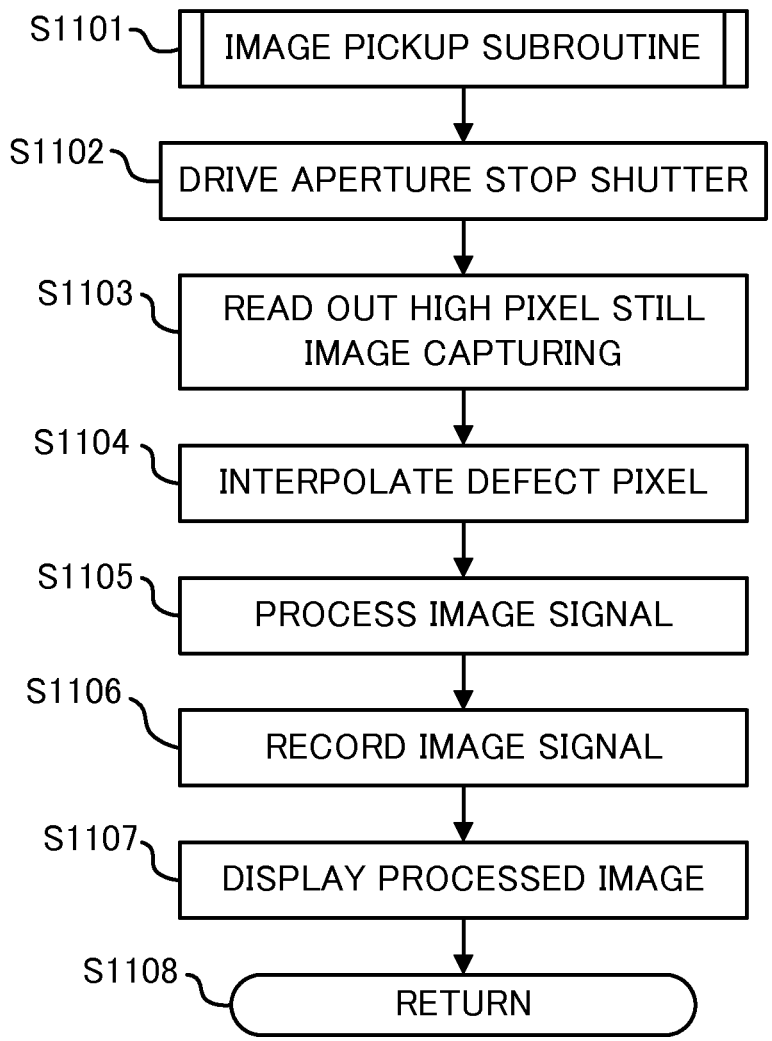
FIG. 11 is a flowchart illustrating an image pickup operation of the image pickup apparatus according to the embodiment.

Subsequently, referring to FIGS. 9 to 11, a method (a focusing operation and an image pickup operation of the camera) of controlling the image pickup apparatus 100 according to the embodiment will be described. FIG. 9 is a flowchart of the method (operation of the image pickup apparatus) of controlling the image pickup apparatus 100. Each step in FIG. 9 is performed mainly based on a command (instruction) from the CPU 121.

When the photographer turns on a power switch (main switch) of the image pickup apparatus 100 first at step S901, the CPU 121 checks operation of each actuator of the image pickup apparatus 100 and the image pickup element 107 at step S902. The CPU 121 initializes memory contents and an execution program and performs an image capturing preparation operation. Subsequently at step S903, the CPU 121 starts an image pickup operation of the image pickup element 107 and outputs a low pixel moving image for preview. Then at step S904, the CPU 121 displays an image (preview image) read out from the image pickup element 107 on the display unit 131 provided on a back of the image pickup apparatus 100. The photographer sees the preview image and determines a composition at image capturing. Subsequently at step S905, the CPU 121 determines a focus detection region in the image.

Next at step S1001, the CPU 121 executes a focus detection subroutine. FIG. 10 is a flowchart of the focus detection subroutine (step S1001 in FIG. 9). The flow proceeds from step S1001 in FIG. 9 to the subroutine in FIG. 10, and then at step S1002, the CPU 121 (and the image pickup element drive circuit 124) reads out first pixel signals from a plurality of focus detection pixels and second pixel signals from a plurality of image pickup pixels. In other words, the CPU 121 reads out the first pixel signals from the focus detection pixels included in a focus detection region determined at step S905 of a main routine (FIG. 9) and the second pixel signals from the image pickup pixels neighboring the focus detection pixels.

Subsequently at step S1003, the CPU 121 (first evaluation value calculation unit 121a) performs correlation calculation based on the first pixel signals obtained from the focus detection pixels and calculates a first correlation evaluation value. In other words, the CPU 121 (first evaluation value calculation unit 121a) calculates information related to a first phase difference based on phase-difference detection signals (focus detection pixel signals) output from the image pickup element 107. In the present embodiment, the CPU 121 (first calculation unit) calculates, as the information related to the first phase difference, a correlation evaluation value (first correlation evaluation value) based on two image signals output from the image pickup element 107. That is, the CPU 121 performs correlation calculation between two images on the obtained focus detection pixel signals (first pixel signals) and calculates a relative position shift amount (first image shift amount as the first correlation evaluation value) between the two images. In the present embodiment, the CPU 121 (first evaluation value calculation unit 121a) performs correlation calculation represented by Expression (6) below on pairs of image signals (a1 to an and b1 to bn where n is the number of data) read out from a row of the focus detection pixels. This calculates a correlation amount Corr(l) as the first correlation evaluation value.

$$\mathrm{Corr}(l) = \sum_{k=0}^{n-l-1} |a_k - b_{k+1}| \quad (6)$$

In Expression (6), l is an image shift amount, and the number of data after an image shift is limited to be n-l. The image shift amount l is an integer and a relative shift amount in units of data separations of a data array. For a highest correlation between a pair of data, a correlation amount Corr (l) as a calculation result of Expression (6) is at the minimum. The correlation amount Corr (m) (m is a shift amount at the minimum) and the correlation amount calculated with a shift amount close to m are used to calculate, by three-point interpolation, a shift amount d that gives a continuous correlation amount Corr(d) is at the minimum.

Subsequently at step S1004, the CPU 121 calculates the reliability of a correlation calculation result. The reliability is the value of Corr(d) of the correlation amount Corr(l) calculated by Expression (6) when the correlativity is highest. A large defocus amount leads to a large asymmetry between the image A and the image B. Therefore, the minimum value Corr(d) is overcalculated and the reliability degrades. As the lens is positioned closer to an in-focus position, the minimum value Corr(d) is undercalculated and the reliability increases.

Subsequently at step S1005, the CPU 121 (second evaluation value calculation unit 121b) performs the correlation calculation based on the second pixel signals obtained from the image pickup pixels to calculate a second correlation evaluation value. In other words, the CPU 121 (second calculation unit) calculates information related to the second phase difference based on image pickup signals (image pickup pixel signals) output from the image pickup element 107. In the present embodiment, the CPU 121 (second calculation unit) calculates, as the information related to the second phase difference, the correlation evaluation value (second correlation evaluation value) based on two image signals output from the image pickup element 107. That is, the CPU 121 performs the correlation calculation between two images on signals (second pixel signals) from image pickup pixels neighboring a focus detection pixel, and calculates a relative position shift amount (second image shift amount as the second correlation evaluation value between the two images). The correlation calculation method used in this calculation is the same method using Expression (6). Then at step S1006, the CPU 121 calculates the reliability of a correlation calculation result. The reliability is calculated in the same manner as that at step S1004.

Subsequently at step S1007, the CPU 121 (focus the detection unit 121c) detects a focus state based on the first correlation evaluation value (first image shift amount) and the second correlation evaluation value (second image shift amount). In other words, the CPU 121 (detection unit) detects the focus state based on information of the first phase difference and the second phase difference. In the present embodiment, the CPU 121 (focus the detection unit 121c) modifies (corrects) a first correlation calculation evaluation value with a second correlation calculation evaluation value based on image pickup pixels (second pixel signals) neighboring a focus detection pixel and calculates a third correlation calculation evaluation value. This correction is performed by Expressions (4) and (5). In other words, the focus the detection unit 121c detects the focus state based on an addition value of the first correlation evaluation value and the second correlation evaluation value (or, a subtraction value of the first correlation evaluation value from the second correlation evaluation value).

Then at step S1008, the CPU 121 (focus detection unit) detects the focus state based on the image shift amount (the corrected image shift amount, that is, the third correlation calculation evaluation value) obtained at step S1007. In other words, the CPU 121 multiplies the image shift amount obtained at step S1007 with a predetermined defocus conversion coefficient to calculate the defocus amount DEF.

Subsequently at step S1009, the CPU 121 determines whether a ranging calculation (focus detection calculation) is completed on all ranging lines (focus detection lines) in a ranging region (focus detection region). When the ranging calculation is not completed on all ranging lines, the flow goes back to step S1002, and the processing at step S1002 to S1009 is repeated for remaining lines.

On the other hand, when the ranging calculation is completed on all ranging lines, the flow proceeds to step S1010. Then at step S1010, the CPU 121 performs the processing of preferentially using information obtained from a focus detection line among a plurality of focus detection lines in the ranging region, the information having high reliabilities (correlation reliabilities) calculated at step S1004 and step S1006. Then the CPU 121 determines a final ranging result (final focus detection result) based on the processing. Subsequently at step S1011, the flow proceeds to step S907 in the main routine in FIG. 9.

At step S907 in FIG. 9, the CPU 121 determines whether the detected defocus amount is equal to or smaller than an acceptable value, that is, whether an in-focus state is achieved. When the detected defocus amount is larger than the acceptable value, the CPU 121 determines that the in-focus state is not achieved, that is, the focus state is out-of-focus state. Then at step S908, the CPU 121 (the focus drive circuit 126, the focus actuator 114) performs drive control of the third lens unit 105 (focus lens). After that, the processing at steps S1001 and S907 is repeated.

On the other hand, when the in-focus state is determined to be achieved at step S907, the CPU 121 performs focusing display on the display unit 131 at step S909. Subsequently at step S910, the CPU 121 determines whether an image capturing start switch is turned on. When the image capturing start switch is not turned on, the CPU 121 repeats the processing at step S910 and maintains an image capturing standby state.

On the other hand, when the image capturing start switch is turned on at step S910, the flow proceeds to step S1101, and the CPU 121 executes an image capturing subroutine. FIG. 11 is a flowchart of the image capturing subroutine (step S1101 in FIG. 9).

When the image capturing start switch is turned on, at step S1102, the CPU 121 (the aperture stop shutter drive circuit 128, the aperture stop shutter actuator 112) performs drive control of a light intensity adjusting aperture stop (the aperture stop shutter 102). In this manner, the CPU 121 performs opening control of a mechanical shutter to determine an exposure time. Subsequently at step S1103, the CPU 121 (the image pickup element drive circuit 124) performs image readout for high pixel still image capturing, that is, readout of all pixels. Subsequently at step S1104, the CPU 121 performs defect pixel interpolation of image signals thus read out. A focus detection pixel signal has a different structure from that of an image pickup pixel that would be otherwise arranged at the position of the focus detection pixel. Thus, an image pickup signal needs to be generated based on an output of the focus detection pixel or outputs of image pickup pixels neighboring the focus detection pixel.

Subsequently at step S1105, the image processing circuit 125 performs image processing such as γ(gamma) correction and edge enhancement. Then at step S1106, the CPU 121 records a processed image (shot image) in the flash memory 133. At step S1107, the CPU 121 displays the processed image on the display unit 131. Then at step S1108, the flow returns to the main routine in FIG. 9. Once the flow is back at the main routine in FIG. 9, a series of image pickup operations end at step S912.

As described above, in the present embodiment, the focus the detection unit 121c detects a focus state based on the first correlation evaluation value and the second correlation evaluation value. Preferably, the focus the detection unit 121c corrects the first correlation evaluation value based on the second correlation evaluation value to calculate a third correlation evaluation value, and detects the focus state based on the third correlation evaluation value. Preferably, the focus the detection unit 121c detects the focus state based on the addition value of the first correlation evaluation value and the second correlation evaluation value.

More preferably, a pair of image pickup pixels used in calculation of the second correlation evaluation value among a plurality of image pickup pixels have the same relative position relation as that of a pair of focus detection pixels among a plurality of focus detection pixels. Preferably, a plurality of focus detection pixels and a plurality of image pickup pixels used in calculation of the second correlation evaluation value have the same spectral sensitivity.

The present embodiment achieves maintenance of focus detection performance and prevention of image degradation in an image pickup apparatus including an image pickup element including a focus detection pixel and an image pickup pixel. The present embodiment provides a detection apparatus, an image pickup apparatus, and an image pickup system that are capable of performing highly accurate focus detection through an image pickup element including a focus detection pixel, and a method of controlling the detection apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

[Other Embodiments]

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiment (s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD) ™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-217328, filed on Oct. 18, 2013, which is hereby incorporated by reference herein in its entirety.

What is claimed is:

1. A detection apparatus configured to detect a focus state based on an output signal from an image pickup element capable of outputting an image pickup signal and a phase-difference detection signal, wherein the image pickup element includes a plurality of first lines which do not include a plurality of second pixel portions and a plurality of second lines which include a plurality of first pixel portions and the plurality of second pixel portions, wherein each of the plurality of first pixel portions and each of the plurality of second pixel portions are located adjacent to each other and are arranged alternately with respect to each other, and wherein each of the plurality of second pixel portions of the plurality of second lines has an opening which is smaller than an opening of each respective one of the plurality of first pixel portions, the detection apparatus comprising:
a first calculation unit configured to calculate a first phase difference between phase-difference detection signals read out from the second pixel portions of at least two second lines between which the first lines are sandwiched, wherein the openings of one second line of the at least two second lines are located at different sides from the openings of another second line of the at least two second lines;
a second calculation unit configured to calculate a second phase difference between the image pickup signals which are obtained from the plurality of first pixel portions each of which is located adjacent to each of the plurality of the second pixel portions; and
a detection unit configured to detect the focus state based on the first phase difference and the second phase difference.

2. The detection apparatus according to claim 1, wherein an opening of a photoelectric conversion portion that outputs the image pickup signal is larger than an opening of a photoelectric conversion portion that outputs the phase-difference detection signal.

3. The detection apparatus according to claim 1, wherein the image pickup element outputs the phase-difference detection signal from a photoelectric conversion portion where an exit pupil is divided.

4. The detection apparatus according to claim 1, wherein the first calculation unit and the second calculation unit respectively calculate, as the first phase difference and the second phase difference, a first correlation evaluation value and a second correlation evaluation value based on phase-difference detection signals output from the image pickup element.

5. The detection apparatus according to claim 1, wherein the first calculation unit and the second calculation unit are capable of sharing the same calculation circuit.

6. The detection apparatus according to claim 4, wherein the detection unit detects the focus state based on an addition value of the first correlation evaluation value and the second correlation evaluation value.

7. The detection apparatus according to claim 1, wherein a signal contributive to calculation of the second phase difference is an output signal from a pixel portion disposed around another pixel portion that outputs the phase-difference detection signal.

8. The detection apparatus according to claim 1, wherein a photoelectric conversion portion that outputs the image pickup signal is adjacent to a photoelectric conversion portion that outputs the phase-difference detection signal.

9. An image pickup apparatus comprising:
the detection apparatus according to claim 1; and
a control unit configured to control focusing based on the focus state detected by the detection apparatus.

10. An image pickup system comprising:
the image pickup apparatus according to claim 9; and
a lens apparatus removably mounted on the image pickup apparatus.

11. An image pickup apparatus comprising:
an image pickup element including a plurality of first lines which do not include a plurality of second pixel portions and a plurality of second lines which include a plurality of first pixel portions and the plurality of second pixel portions, wherein each of the plurality of first pixel portions and each of the plurality of second pixel portions are located adjacent to each other and arranged alternately with respect to each other,
wherein each of the plurality of second pixel portions of the plurality of second lines has an opening which is smaller than an opening of each respective one of the plurality of first pixel portions, and
wherein the image pickup element is capable of outputting an image pickup signal and a phase-difference detection signal;
a detection apparatus configured to detect a focus state based on an output signal from the image pickup element, the detection apparatus comprising:
a first calculation unit configured to calculate a first phase difference between phase-difference detection signals read out from the second pixel portions of at least two second lines between which the first lines are sandwiched, wherein the openings of one second line of the at least two second lines are located at different sides from the openings of another second line of the at least two second lines;
- a second calculation unit configured to calculate a second phase difference between the image pickup signals which are obtained from the plurality of first pixel portions each of which is located adjacent to each of the plurality of second pixel portions; and
- a detection unit configured to detect the focus state based on the first phase difference and the second phase difference;

and a control unit configured to control focusing based on the focus state detected by the detection apparatus.

12. A method of controlling a detection apparatus configured to detect a focus state based on an output signal from an image pickup element capable of outputting an image pickup signal and a phase-difference detection signal, wherein the image pickup element includes a plurality of first lines which do not include a plurality of second pixel portions and a plurality of second lines which include a plurality of first pixel portions and the plurality of second pixel portions, and wherein each of the plurality of first pixel portions and each of the plurality of second pixel portions are located adjacent to each other and arranged alternately with respect to each other, the method comprising the steps of:

- calculating a first phase difference between phase-difference detection signals read out from the second pixel portions of at least two second lines between which the first lines are sandwiched, wherein openings of one second line of the at least two second lines are located at different sides from openings of another second line of the at least two second lines;
- calculating a second phase difference between the image pickup signals which are obtained from the plurality of first pixel portions each of which is located adjacent to each of the plurality of second pixel portions; and
- detecting the focus state based on the first phase difference and the second phase difference,
- wherein each of the plurality of second pixel portions of the plurality of second lines has an opening which is smaller than an opening of each respective one of the plurality of first pixel portions.

\* \* \* \* \*